United States Patent
Wake et al.

(10) Patent No.: US 6,436,162 B1
(45) Date of Patent: Aug. 20, 2002

(54) TWIST AND LOCK FILTER HOUSING WITH ANTI-ROTATION STOP

(75) Inventors: Jon S. Wake, Verona, WI (US); Michael J. Mikolichek, Mayer, MN (US); Donald E. Stiemke, Madison; Mark V. Holzmann, Stoughton, both of WI (US)

(73) Assignee: Nelson Industries, Inc., Stoughton, WI (US)

(*) Notice: Subject to any disclaimer, the term of this patent is extended or adjusted under 35 U.S.C. 154(b) by 0 days.

(21) Appl. No.: 09/533,006

(22) Filed: Mar. 22, 2000

(51) Int. Cl.[7] .................................................. B01D 46/24
(52) U.S. Cl. ............................ 55/498; 55/502; 55/503; 55/504
(58) Field of Search .......................... 55/498, 502, 503, 55/504, 385.3; 123/198 E

(56) References Cited

U.S. PATENT DOCUMENTS

| | | |
|---|---|---|
| 4,215,790 A | 8/1980 | Ribble et al. |
| 4,261,718 A | 4/1981 | Garner |
| 4,331,247 A | 5/1982 | Mumford |
| 4,333,580 A | 6/1982 | Sweigart, Jr. |
| 4,501,376 A | 2/1985 | Bushby |
| 4,719,012 A | 1/1988 | Groezinger et al. |
| 4,759,783 A | 7/1988 | Machado |
| 5,049,170 A | 9/1991 | Parnoff |
| 5,106,397 A | 4/1992 | Jaroszczyk et al. |
| 5,114,572 A | 5/1992 | Hunter et al. |
| 5,137,557 A | 8/1992 | Behrendt et al. |
| 5,547,480 A | 8/1996 | Coulonvaux et al. |
| 5,676,273 A | 10/1997 | Jonkers et al. |
| 5,693,109 A * | 12/1997 | Coulonvaux ............. 55/498 |
| 5,730,769 A | 3/1998 | Dungs et al. |
| 5,755,842 A | 5/1998 | Patel et al. |
| 5,800,581 A | 9/1998 | Gielink et al. |
| 5,803,939 A | 9/1998 | Huning |
| D407,475 S | 3/1999 | Coulonvaux et al. |
| 5,876,600 A | 3/1999 | Matsubara et al. |
| D412,567 S | 8/1999 | Ward et al. |
| 5,948,246 A | 9/1999 | Zuk, Jr. |
| 6,039,778 A | 3/2000 | Coulonvaux |
| 6,051,042 A | 4/2000 | Coulonvaux |
| B16,187,240 B1 * | 2/2001 | Coulonvaux ............. 55/498 |

FOREIGN PATENT DOCUMENTS

| | | |
|---|---|---|
| EP | 0580501 | 1/1994 |
| EP | 1093829 | 4/2001 |
| EP | 1093839 | 4/2001 |
| EP | 1136111 | 9/2001 |
| FR | 2712506 | 4/1995 |
| GB | 2138411 | 10/1984 |
| WO | 98/40147 | 9/1998 |
| WO | 99/14483 | 3/1999 |

OTHER PUBLICATIONS

Patent Abstracts of Japan, vol. 1997, No. 11, Nov. 28 1997 & JP 09–173717.

* cited by examiner

*Primary Examiner*—David A. Simmons
*Assistant Examiner*—Minh-Chau T. Pham

(57) ABSTRACT

An air filter housing (12) includes twist and lock structure (46) having a first position (FIGS. 5, 6) permitting axial movement (120) of a cover (44) and base (38) relative to each other, and being rotatable in a first direction (48) from the first position (FIG. 6) to the second position (FIG. 7), and in the second position (FIG. 7) preventing axial movement of the base (38) and cover (44) relative to each other, and being rotatable in a second opposite direction (78) from the second position (FIG. 7) to the first position (FIG. 6). Anti-rotation lock structure (80) provides a rotational retention force holding the twist and lock structure (46) in the second position (FIG. 7).

12 Claims, 3 Drawing Sheets

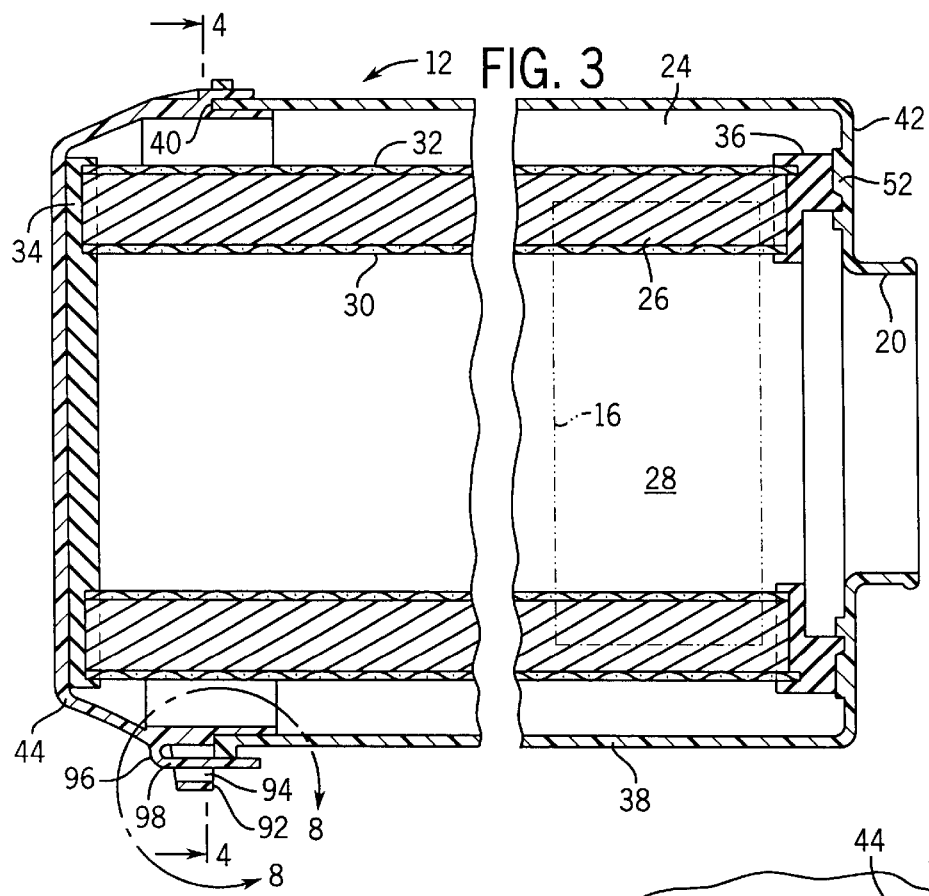
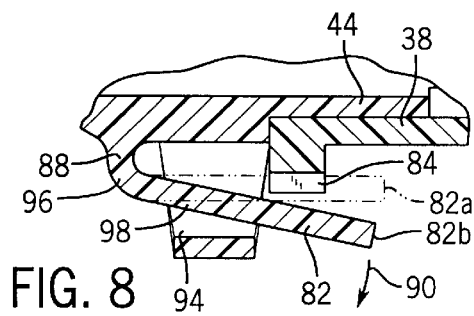
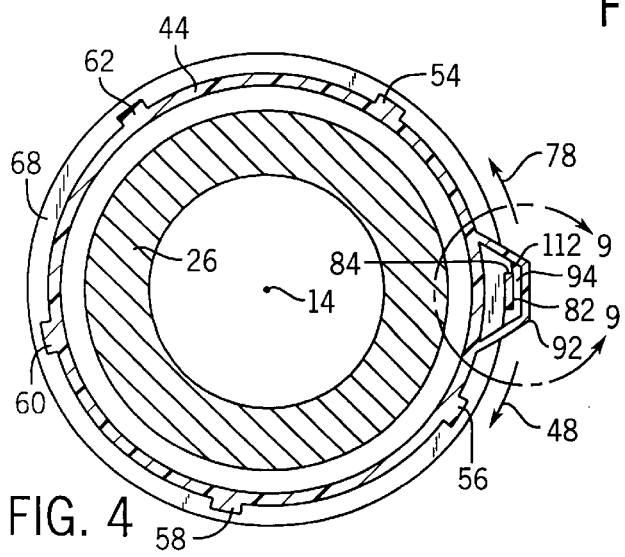
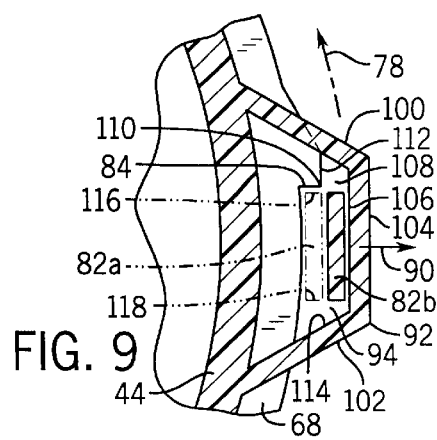

TWIST AND LOCK FILTER HOUSING WITH ANTI-ROTATION STOP

BACKGROUND AND SUMMARY

The invention relates to filter housings, and more particularly to twist and lock filter housings, including plastic air cleaners.

Twist and lock filter housings are known in the prior art, including twist and lock plastic air cleaner housings. Such housings typically use nuts and bolts, overcenter latches, hinges, sliding lock components for anti-rotation, or a combination of these, to fasten the cover to the base.

The present invention provides a simple, cost effective system for locking the cover to the base in a twist and lock filter housing arrangement. In a desirable aspect, the invention enables a reduced number of components, and offers a cost advantage as well as simplicity over prior twist and lock systems using separate locking mechanisms.

In a further aspect, the invention provides in combination twist and lock structure providing an axial retention force and releasable anti-rotation lock structure providing a rotational retention force releasably holding the twist and lock structure in locked axially assembled condition. In one particularly desirable aspect, the invention enables both of such structures to be integral with their respective base or cover of a plastic air cleaner housing. This eliminates the expense of additional fasteners or components otherwise required to be attached to the base and/or cover.

BRIEF DESCRIPTION OF THE DRAWINGS

FIG. 3 is a sectional view taken along line 3—3 of FIG. 1.

FIG. 4 is a sectional view taken along line 4—4 of FIG. 3.

FIG. 8 is an enlarged sectional view along section 8—8 of FIG. 3.

FIG. 9 is an enlarged sectional view along section 9—9 of FIG. 4.

DETAILED DESCRIPTION

Figure 1:
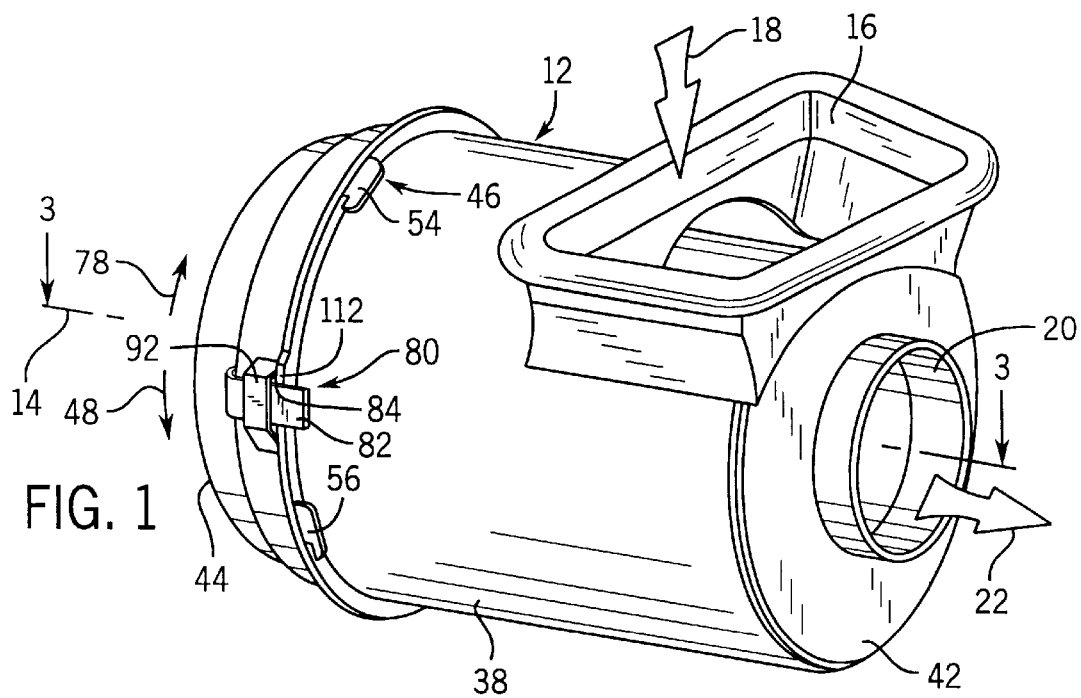
FIG. 1 is a perspective view of an assembled filter housing in accordance with the invention.

FIGS. 1–4 show a filter housing 12 extending along an axis 14 and having an air inlet 16 for receiving dirty air as shown at arrow 18, and an air outlet 20 for discharging clean filtered air as shown at arrow 22. The dirty air flows into an annular space 24, FIG. 3, in the housing and then radially inwardly through annular filter element 26 into hollow interior 28 and then axially rightwardly in FIG. 3 through outlet 20. Filter element 26 is provided by an annulus of pleated filter media having inner and outer perforated metal liners 30 and 32, respectively, and potted in distally opposite end caps 34 and 36 which are preferably formed of compressible material such as urethane, all as is known in the art. The housing has a base 38 extending axially between distally opposite axial ends 40 and 42, and a cover 44 mounted to axial end 40 of the base by twist and lock structure 46, FIG. 1, to be described, providing an axial retention force holding base 38 and cover 44 in axial assembled condition upon axial movement of the base and cover towards each other followed by rotation in a first direction about axis 14, e.g. rotation of cover 44 clockwise in FIG. 4 as shown at arrow 48. In the assembled condition, FIG. 3, end caps 34 and 36 are axially compressed to provide sealing and prevent bypass of dirty air from space 24 around the filter to hollow interior 28. Cover 44 engages and locates end cap 34, FIG. 3, and end 42 of base 38 has an inner ridged and grooved surface 52, FIG. 3, engaging and locating end cap 36.

Figure 2:
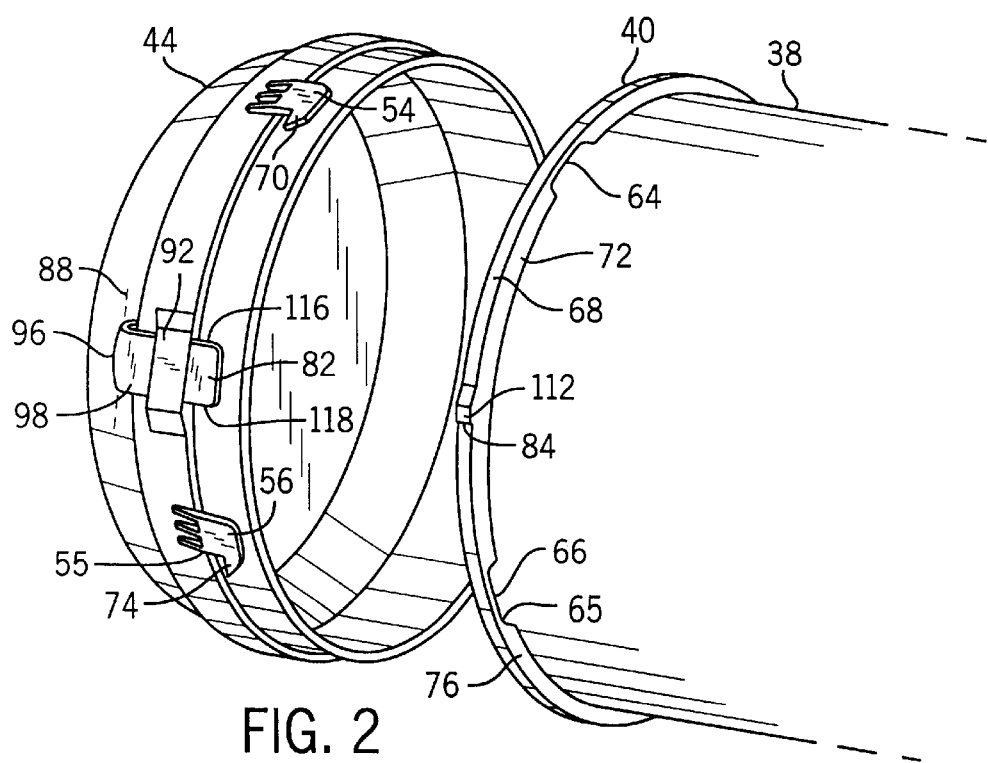
FIG. 2 is an exploded perspective view of a portion of the structure of FIG. 1.

Twist and lock structure 46, FIG. 1, includes a plurality of hooks 54, 56, 58, 60, 62, FIGS. 1, 2, 4, on cover 44 engaging a respective plurality of catches 64, 66, etc., FIG. 2, on base 38. The catches are formed by respective through-slots in annular raised rim 68 at end 40 of base 38. Referring to FIG. 2, cover 44 is slid axially rightwardly such that hook 54 passes axially through slot 64, hook 56 passes axially through slot 66, etc., and then cover 44 is turned or twisted to rotate about axis 14, arrow 48, FIG. 4, so that tip 70, FIG. 2, of hook 54 slides along and behind the axially rightwardly facing rear surface of rim 68 at 72, and such that tip 74 of hook 56 slides along and behind the axially rightwardly facing rear surface of rim 68 at 76, and likewise for the remaining hooks. The number of hooks may be varied to provide a desired axial retention force balanced around the circumference of the housing. In an alternative, the hooks can be provided on base 38, and the catches on cover 44. The noted axial insertion of cover 44 onto base 38 followed by rotation provides twist and lock operation providing an axial retention force holding the base and cover in axial assembled condition. The twist and lock structure has a first position, FIGS. 5 and 6, to be described, permitting axial movement of the base and cover relative to each other. The twist and lock structure is rotatable in a first direction 48 from the first position to a second position, FIG. 7, to be described. The twist and lock structure in the second position prevents axial movement of the base and cover relative to each other. The twist and lock structure is rotatable in a second direction 78 from the second position to the first position, the second direction being opposite to the first direction. For example, in FIGS. 1 and 4, cover 44 is rotated along direction 48 to the second locking position, and is rotated along direction 78 to the first unlocking position.

Anti-rotation lock structure 80, FIG. 1, provides a rotational retention force holding the twist and lock structure in the noted locked second position. The anti-rotation lock structure includes a movable tab 82 on cover 44 and having a locking position as shown in dashed line at 82a in FIGS. 8 and 9 engaging a stop surface 84 on cover 38 after the noted first direction of rotation 48 about axis 14, i.e. after clockwise rotation of cover 44 in FIGS. 4 and 9, and then preventing rotation along the noted second opposite direction 78 about axis 14, i.e. counterclockwise rotation as shown at arrow 78 in FIG. 9, until tab 82 is moved away from stop surface 84 to a released position as shown in solid line at 82b in FIGS. 8 and 9. The noted hooks, catches, tab and stop surface are each integral with their respective base and cover. In preferred form, the hooks and the tab are integral with cover 44, and the catches and the stop surface are integral with base 38. The members are preferably plastic and respectively formed during molding.

Tab 82 flexes along a bend line 88, FIG. 2, which is tangent to an arc of rotation about axis 14. When tab 82 flexes, it moves in a radial direction relative to axis 14, as shown at arrow 90 in FIG. 9. Engagement of tab 82 against stop surface 84, FIGS. 1, 4, prevents the noted rotation along direction 78. The stop surface force is along a retentional force direction parallel to bend line 88.

Cover 44 has a guard 92, FIGS. 1, 2, 4, 9, extending radially outwardly beyond tab 82. The tab is folded back under the guard. Guard 92 has an opening 94, FIGS. 3, 4, extending axially therethrough. Tab 82 extends around a fold-back bend 96 and then extends axially at 98 through opening 94. Tab 82 is normally self-biased radially inwardly to the locking position 82*a*, FIGS. 8, 9. Tab 82 is manually moved radially outwardly, arrow 90, against the bias to the released position 82*b*. Guard 92 has a pair of sides 100, 102, FIG. 9, extending outwardly from housing cover 44 and joined by an outer bridge 104 to define opening 94 through which tab 82 extends. The undersurface 106 of bridge 104 is spaced radially outwardly of tab 82 by a radial gap 108 through which tab 82 may be flexed in the noted radial direction 90. Undersurface 106 limits the amount of radial outward flexing of tab 82 to protect the latter, i.e. to prevent overstressing or overflexing of the tab about bend line 88 at fold-back bend 96, e.g. to prevent the tab from being broken off. Undersurface 106 is spaced radially outwardly of the radially outer edge 110, FIG. 9, of stop surface 84 by a gap at 108 having a radial width greater than the radial thickness of tab 82. This enables clearance for the noted rotation of cover 44 in the released position of tab 82 at position 82*b*. A raised shoulder 112 forms the radially outer edge 110 of stop surface 84. Stop surface 84 extends radially downwardly from edge 110 of shoulder 112. Tab 82 is flexed radially outwardly as shown at arrow 90, against its bias, to clear edge 110 and shoulder 112 during twisting of the cover and base. In the noted first direction of rotation 48, i.e. clockwise rotation of cover 44 in FIGS. 4 and 9, tab 82 snaps back radially inwardly along stop surface 84, i.e. from solid line position 82*b* to dashed line position 82*a* in FIG. 9, after tab 82 passes edge 110 of shoulder 112. A small amount of further rotation of cover 44 along direction 48 may be permitted, but then is stopped by engagement of the sides such as 55, FIG. 2, of the hooks such as 56 against respective sides such as 65 of the catch slots such as 66. For release, tab 82 is again manually flexed radially outwardly as shown at arrow 90 from dashed line position 82*a* to solid line position 82*b*, FIGS. 9 and 8, to enable counterclockwise rotation of cover 44 as shown at arrow 78, to the noted first position of the twist and lock structure to in turn enable disassembly of the housing by axial separation of cover 44 and base 38.

Stop surface 84, FIG. 9, is a first stop surface extending radially relative to axis 14. The inside surface 114 of side 102 of bridge 92 provides a second stop surface. Tab 82 extends between first and second stop surfaces 84 and 114 after the noted twist and lock. Tab 82 has first and second circumferentially spaced oppositely facing sides 116 and 118, FIGS. 9 and 2. First side 116 faces first stop surface 84. Second side 118 faces second stop surface 114. Attempted twisting along rotational direction 78 is stopped by engagement of first side 116 of tab 82 against first stop surface 84. Further attempted twisting along direction 78 otherwise torsionally bending tab 82 about a line different than bend line 88 is stopped by engagement of second stop surface 114 against second side 118 of tab 82. This provides a safety back-up.

Figure 5:
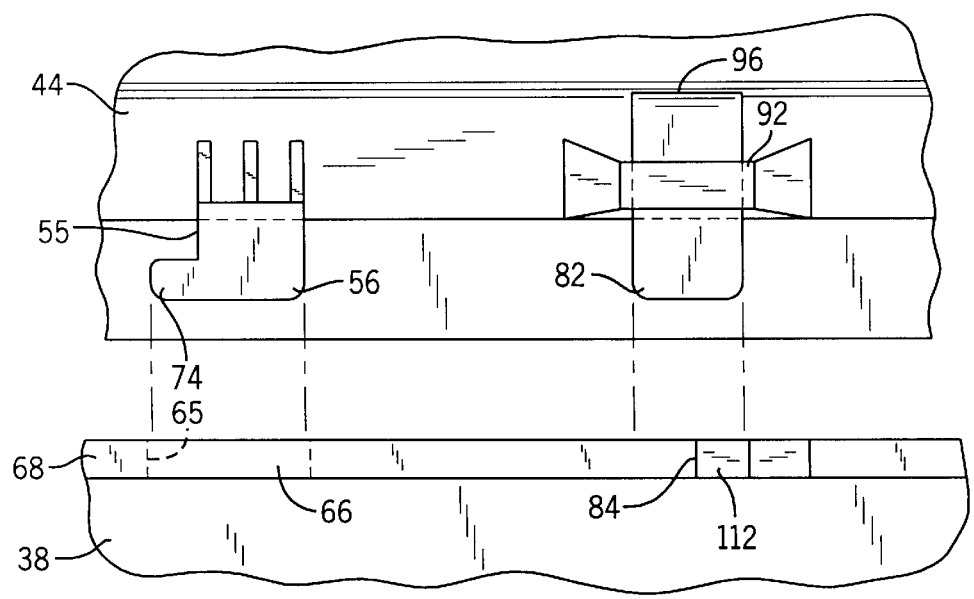
FIG. 5 is a schematic elevation view of a portion of the structure of FIG. 2.
Figure 6:
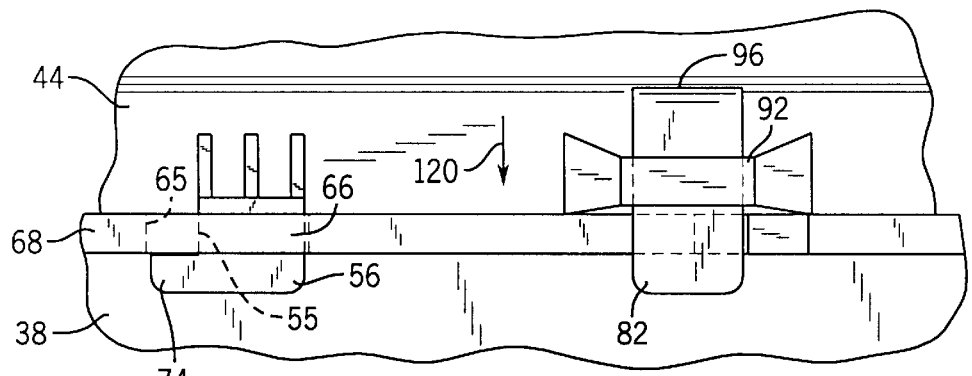
FIG. 6 is a view like FIG. 5 and shows axial insertion of the parts.
Figure 7:
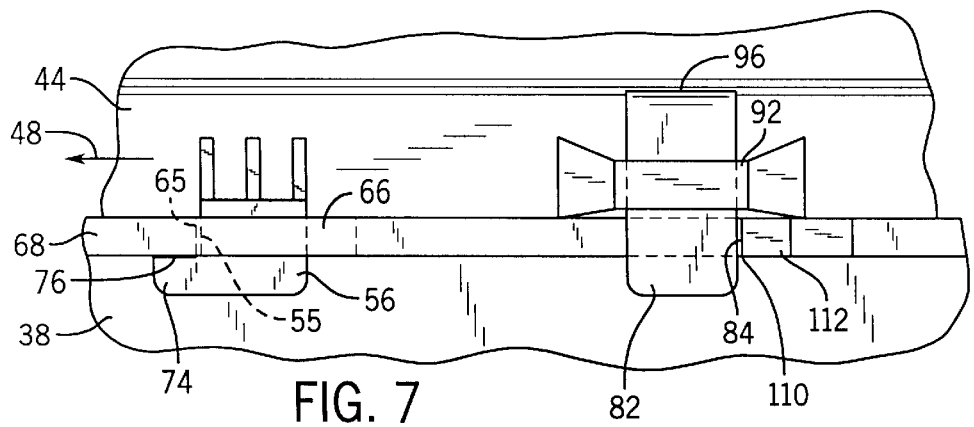
FIG. 7 is a view like FIG. 6 and shows the parts after twisting and locking.

FIGS. 5–7 illustrate operation of the above described structure. FIG. 5 shows cover 44 and base 38 axially separated. In FIG. 6, cover 44 is axially inserted onto base 38 as shown at arrow 120, with tab 82 axially inserted through opening 94 of bridge 92, and with hook 56 axially inserted through catch slot 66 in rim 68. During the axial movement of cover 44 as shown at arrow 120, tab 82 is manually flexed radially outwardly, as shown at arrow 90 in FIG. 9, from position 82*a* to position 82*b*, to enable clearance of tab 82 radially outwardly of shoulder 112. FIG. 7 shows rotation of cover 44 as shown at directional arrow 48, which is clockwise in FIG. 4, such that tip 74 of hook 56 slides along and behind axially facing surface 76, FIG. 2, of rim 68 of base 38, and such that tab 82 snaps back radially inwardly along stop surface 84, FIG. 9, from position 82*b* to position 82*a* after passing edge 110 of shoulder 112.

Anti-rotation lock structure 80 has a first condition as shown at 82*a*, FIGS. 9 and 8, blocking rotation of twist and lock structure 46 from the FIG. 7 position to the FIG. 6 position. Anti-rotation lock structure 80 has a second condition, as shown at 82*b*, FIGS. 9 and 8, permitting rotation of twist and lock structure 46 between the positions of FIGS. 6 and 7. Anti-rotation lock structure 80 requires manual release thereof from the first condition 82*a* to the second condition 82*b* before permitting rotation of twist and lock structure 46 from the FIG. 7 position to the FIG. 6 position. Anti-rotation lock structure 80 is normally in its first condition 82*a*, and is manually releasable to its second condition 82*b*. Anti-rotation lock structure 80 is biased to first condition 82*a* by the self-bias of tab 82, and is manually released against such bias to second condition 82*b* by the operator manually flexing tab 82 radially outwardly as shown at arrow 90, FIG. 9. Anti-rotation lock structure 80 is in its second condition 82*b* during rotation of twist and lock structure 46 along direction 48, FIG. 4. Once tab 82 is flexed radially outwardly beyond shoulder 112 to enable the noted axial insertion as shown at 120 from the position of FIG. 5 to the position of FIG. 6, the operator may release tab 82, and the tab will then rest on top of shoulder 112 and slide therealong as cover 44 is rotated clockwise along direction 48, FIG. 4, until tab 82 at side 116, FIG. 9, moves past edge 110 of shoulder 112, whereupon tab 82 snaps back radially inwardly from position 82*b* to position 82*a*.

It is recognized that various equivalents, alternatives and modifications are possible within the scope of the appended claims.

What is claimed is:

1. A filter housing extending along an axis comprising a base extending axially between distally opposite axial ends, a cover mounted to one of said axial ends by twist and lock structure providing an axial retention force holding said base and cover in axial assembled condition upon axial movement of said base and cover towards each other followed by rotation in a first direction about said axis, said twist and lock structure having a first position permitting axial movement of said base and cover relative to each other, said twist and lock structure being rotatable in said first direction from said first position to a second position, said twist and lock structure in said second position preventing axial movement of said base and cover relative to each other, said twist and lock structure being rotatable in a second direction from said second position to said first position, said second direction being opposite to said first direction, and anti-rotation lock structure providing a rotational retention force holding said twist and lock structure in said second position, wherein said anti-rotation lock structure has a first condition blocking rotation of said twist and lock structure from said second position to said first position, and a second condition permitting rotation of said twist and lock structure between said first and second positions, said anti-rotation lock structure requires manual release thereof from said first condition to said second condition before permitting rotation of said twist and lock structure from said second position to said first position, said anti-rotation lock structure is normally in said first condition, and is manually releasable to said second condition, said anti-rotation lock structure is biased to said first condition and is manually released against said bias to said second condition, and wherein said anti-rotation lock structure is in said second condition during rotation of said twist and lock structure in said first direction to said second position, whereafter said anti-rotation lock structure snaps to said first condition due to said bias upon completion of rotation of said twist and lock structure to said second position, wherein said anti-rotation lock structure comprises a tab on one of said base and cover and flexing radially outwardly relative to said axis and against said bias to said second condition.

2. A filter housing extending along an axis comprising a base extending axially between distally opposite axial ends, a cover mounted to one of said axial ends by twist and lock structure comprising a plurality of hooks on one of said base and cover engaging a respective plurality of catches on the other of said base and cover in twist and lock relation, and anti-rotation lock structure comprising a movable tab on one of said base and cover and having a locking position engaging a stop surface on the other of said base and cover after a first direction of rotation about said axis and then preventing rotation along a second opposite direction about said axis until said tab is moved away from said stop surface to a released position, wherein said hooks, said catches, said tab and said stop surface are each integral with their respective base and cover, wherein said tab flexes radially outwardly relative to said axis to said released position.

3. A filter housing extending along an axis comprising a base extending axially between distally opposite axial ends, a cover mounted to one of said axial ends by twist and lock structure comprising a plurality of hooks on one of said base and cover engaging a respective plurality of catches on the other of said base and cover in twist and lock relation, and anti-rotation lock structure comprising a movable tab on one of said base and cover and having a locking position engaging a stop surface on the other of said base and cover after a first direction of rotation about said axis and then preventing rotation along a second opposite direction about said axis until said tab is moved away from said stop surface to a released position, wherein said tab flexes along a bend line transverse to said axis.

4. The invention according to claim 3 wherein said bend line is tangent to an arc of said rotation, and when said tab flexes it moves in a radial direction relative to said axis.

5. The invention according to claim 4 wherein engagement of said tab against said stop surface prevents said rotation and is along a retentional force direction parallel to said bend line.

6. The invention according to claim 5 wherein said stop surface is a first stop surface extending radially relative to said axis, and wherein the one of said cover and base having said tab has a second surface, said tab being between said first and second stop surfaces after said twist and lock, said tab having first and second circumferentially spaced oppositely facing sides, said first side facing said first stop surface, said second side facing said second stop surface, such that attempted twisting along said second direction is stopped by engagement of said first side of said tab against said first stop surface, and such that further attempted twisting along said second direction otherwise torsionally bending said tab about a line different than said bend line is stopped by engagement of said second stop surface against said second side of said tab.

7. The invention according to claim 5 wherein said tab is biased radially inwardly to said locking position, and is manually moved radially outwardly against said bias to said released position.

8. The invention according to claim 7 wherein the one of said base and cover having said tab also has a guard extending radially outwardly beyond said tab and having an undersurface spaced radially outwardly of said tab by a radial gap through which said tab may be flexed and limiting the amount of radial outward flexing of said tab to protect the latter.

9. The invention according to claim 8 wherein said undersurface is spaced radially outwardly of the radially outer edge of said stop surface by a gap having a radial width greater than the radial thickness of said tab.

10. The invention according to claim 7 wherein the other of said base and cover having said stop surface has a raised shoulder forming a radially outer edge of said stop surface, said stop surface extending radially downwardly from said shoulder, said tab being flexed radially outwardly against its bias to clear said shoulder during twisting of said base and cover in said first direction of rotation, said tab snapping back radially inwardly along said stop surface after said tab passes said shoulder.

11. A filter housing extending along an axis comprising a base extending axially between distally opposite axial ends, a cover mounted to one of said axial ends by twist and lock structure comprising a plurality of hooks on one of said base and cover engaging a respective plurality of catches on the other of said base and cover in twist and lock relation, and anti-rotation lock structure comprising a movable tab on one of said base and cover and having a locking position engaging a stop surface on the other of said base and cover after a first direction of rotation about said axis and then preventing rotation along a second opposite direction about said axis until said tab is moved away from said stop surface to a released position, wherein the one of said base and cover having said tab also has a guard extending radially outwardly beyond said tab, and wherein said tab is folded back under said guard.

12. The invention according to claim 11 wherein said guard has an opening extending axially therethrough, and said tab extends around a fold-back bend and then extends axially through said opening.

* * * * *